US010009315B2

(12) United States Patent
Dickinson et al.

(10) Patent No.: US 10,009,315 B2
(45) Date of Patent: Jun. 26, 2018

(54) OUTSIDE LIVE MIGRATION

(75) Inventors: Andrew B. Dickinson, Seattle, WA (US); Eric Jason Brandwine, Haymarket, VA (US)

(73) Assignee: Amazon Technologies, Inc., Reno, NV (US)

(*) Notice: Subject to any disclaimer, the term of this patent is extended or adjusted under 35 U.S.C. 154(b) by 1018 days.

(21) Appl. No.: 13/044,494

(22) Filed: Mar. 9, 2011

(65) Prior Publication Data
US 2012/0233329 A1 Sep. 13, 2012

(51) Int. Cl.
*G06F 15/173* (2006.01)
*H04L 29/12* (2006.01)
*H04L 29/08* (2006.01)
*H04L 12/26* (2006.01)

(52) U.S. Cl.
CPC ...... *H04L 61/2084* (2013.01); *H04L 61/1511* (2013.01); *H04L 61/2514* (2013.01); *H04L 67/1002* (2013.01); *H04L 67/18* (2013.01); *H04L 67/2814* (2013.01); *H04L 43/0817* (2013.01); *H04L 61/2076* (2013.01); *H04L 61/2521* (2013.01)

(58) Field of Classification Search
USPC .......................................................... 709/226
See application file for complete search history.

(56) References Cited

U.S. PATENT DOCUMENTS

| | | | |
|---|---|---|---|
| 7,139,840 | B1 | 11/2006 | O'Toole |
| 2003/0046419 | A1 | 3/2003 | King et al. |
| 2004/0037316 | A1* | 2/2004 | Choi et al. .................. 370/466 |
| 2004/0073596 | A1* | 4/2004 | Kloninger et al. ........... 709/200 |

(Continued)

FOREIGN PATENT DOCUMENTS

| | | |
|---|---|---|
| CN | 1988492 | 6/2007 |
| CN | 101918926 | 12/2010 |

(Continued)

OTHER PUBLICATIONS

International Search Report and Written Opinion dated Jun. 7, 2012 in Application No. PCT/US2012/028480.

(Continued)

*Primary Examiner* — Alan S Chou
(74) *Attorney, Agent, or Firm* — Kilpatrick Townsend & Stockton LLP

(57) ABSTRACT

Global remappable addresses can be announced from multiple points across the Internet or other public networks. A global address can be mapped to one or more internal addresses for a provider, such that when traffic is received to a given network location the provider can determine whether the traffic is to be processed in the current network location or a different network location, as may be determined using a static process or a dynamic process based on any of a number of factors. If the traffic is destined for a different network location, the traffic can be remapped and forwarded to that network location over a public or private network. Once the traffic is in the determined destination network location, the traffic can be remapped and delivered to the ultimate destination. The remappings and destination network locations can be adjusted at any time, based on any of a number of factors, without significant risk of dropping traffic.

28 Claims, 5 Drawing Sheets

(56) References Cited

U.S. PATENT DOCUMENTS

| | | | |
|---|---|---|---|
| 2006/0112170 A1 | 5/2006 | Sirkin | |
| 2008/0040306 A1 | 2/2008 | Ma | |
| 2008/0040573 A1 | 2/2008 | Malloy | |
| 2008/0282254 A1* | 11/2008 | Blander et al. | 718/105 |
| 2010/0287548 A1 | 11/2010 | Zhou et al. | |
| 2011/0261828 A1* | 10/2011 | Smith | 370/401 |
| 2012/0269174 A1* | 10/2012 | Yang et al. | 370/332 |

FOREIGN PATENT DOCUMENTS

| | | |
|---|---|---|
| CN | 101952810 | 1/2011 |
| JP | 2000-132524 | 5/2000 |
| JP | 2003-508996 | 3/2003 |
| WO | 2010099367 | 9/2010 |

OTHER PUBLICATIONS

Singapore Patent Application No. 201305349-1, Invitation to Respond to Written Opinion and Written Opinion, dated Jan. 29, 2014.

CA2,824,598, "Office Action", dated Jan. 26, 2015, 3 pages.

Damani, et al., "ONE-IP: Techniques for Hosting a Service on a Cluster of Machines", *Computer Networks and ISDN Systems*, vol. 29, No. 8-13, Sep. 1, 1997, pp. 1019-1027.

EP12755719.7, "Extended European Search Report", dated Feb. 27, 2015, 8 pages.

JP2013-557899, "Notice of Allowance", dated Mar. 3, 2015, 6 pages.

Srisuresh, et al., "Load Sharing using IP Network Address Translation (LSNAT)", *The Internet Society: Network Working Group*, Request for Comments: 2391, Aug. 1998, 19 pages.

2012225301, Australian Patent Application, "Examination Report," dated Sep. 3, 2014, 3 pages.

2013-557899, Japanese Patent Application, "Notice of Rejection," dated Sep. 24, 2014, 1 page.

CN201280012137.8 , "Office Action", dated May 27, 2016, 15 pages.

EP12755719.7 , "Office Action", dated May 11, 2016, 6 pages.

CN201280012137.8 , "Office Action", dated Jul. 4, 2017, 11 pages.

CN201280012137.8 , "Office Action", dated Feb. 24, 2017, 13 pages.

EP12755719.7, "Summons to Attend Oral Proceedings", dated Mar. 30, 2017, 5 pages.

IN6716/DELNP/2013, Office Action dated Feb. 23, 2018, 16 pages.

* cited by examiner

OUTSIDE LIVE MIGRATION

BACKGROUND

As an increasing number of applications and services are being made available over networks such as the Internet, an increasing number of content, application, and/or service providers are turning to technologies such multi-tenant resources and cloud computing. These technologies enable customers to access and/or utilize various types of electronic resources, physical or virtual, where the hardware and/or software used to provide these resources can be dynamically scalable to meet the needs of the multiple customers at any given time. A customer typically will rent, lease, or otherwise pay for access to these resources, and thus does not have to purchase and maintain the hardware and/or software to obtain the functionality provided by these resources.

Using conventional approaches, a customer can launch an instance anywhere that appropriate resources are located to which the customer has access. If a static address is associated with that instance, however, the traffic destined for that static address might be dropped in the event of a network failure or other such occurrence. In some approaches a customer can remap an existing name (e.g., a DNS name) to the public address of a new instance, but such an approach can take several hours for the address to propagate through the Internet, such that new instances might not receive traffic while terminated or unavailable instances continue to receive requests. Further, even when remapping addresses the customer may be limited to a specific region, which can be problematic in the event of a regional network outage or other such event.

BRIEF DESCRIPTION OF THE DRAWINGS

Various embodiments in accordance with the present disclosure will be described with reference to the drawings, in which.

DETAILED DESCRIPTION

Figure 1:
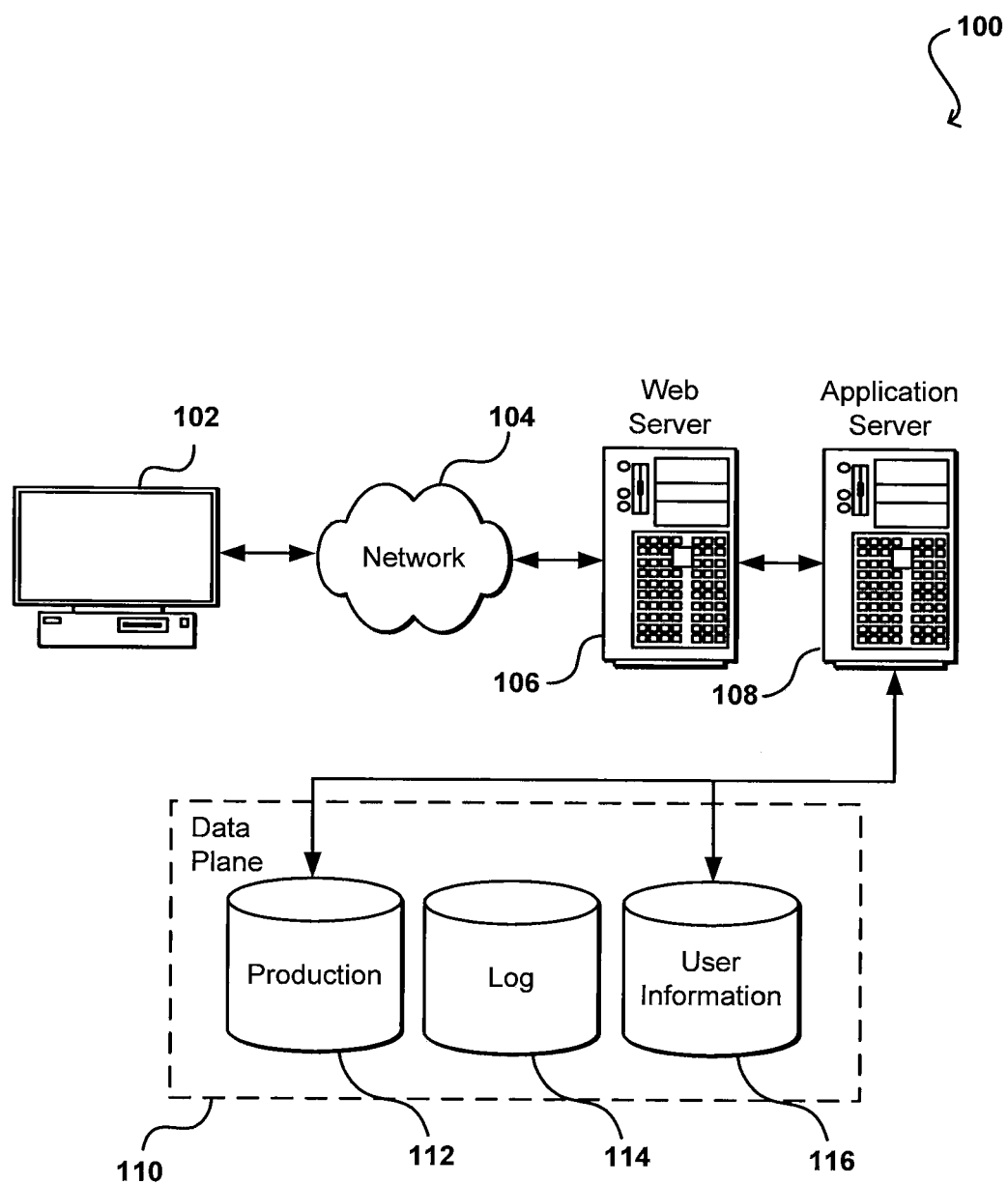
FIG. 1 illustrates an environment in which various embodiments can be implemented.

Systems and methods in accordance with various embodiments of the present disclosure may overcome one or more of the aforementioned and other deficiencies experienced in conventional approaches to managing traffic in an electronic environment. In particular, approaches in accordance with various embodiments provide for the use of remappable addresses that are globally relocatable. These remappable global addresses enable customers to announce addresses from multiple points and/or network locations (e.g., geographically separated regions or different network stacks operated by different providers), while enabling the traffic received at those network locations to be directed to the appropriate instances or other destinations at any given time. Such an approach enables dynamic traffic management without a significant risk of dropping traffic.

In at least some embodiments, a request received to a location from which a global address has been announced can be indirectly remapped and sent back out onto the Internet as quickly as possible, without having to utilize the provider's own network to direct the traffic. In one example, a customer initiating a message in a first region that is destined to a location in a second region can have the message sent to the Internet in the first region and sent over the Internet to the second region, with the Internet components being responsible for determining how to get the request to the address in the second region. Such an approach prevents the provider from carrying that traffic across the provider's own network to the second region, although in at least some embodiments the provider can determine to use a private network under certain circumstances. Such an approach allows for cross-region instance migration for any appropriate purpose at any appropriate time. If the message is initially received to the destination region, the message can be directly remapped to the appropriate instance and delivered to that instance for processing.

In some such embodiments, specific remappable global addresses can be used such that only a fraction of the address space is being announced in various points of present (POPs) or other interface points. The fraction can be announced in some or all POPs, and in some cases different sections of address space can be announced from different POP groupings. In some embodiments, the size of an address block can be selected to be large enough such that a provider can selectively chose a region from which to advertise at least a portion of that space. In some embodiments, pre-allocated blocks of addresses can be used which can be advertised in some or all regions, with the understanding that a large amount of traffic may need to be hauled over the provider network. A large customer could potentially utilize a number of remappable addresses out of the globally advertised block, and take care of determining how to direct the traffic on a smaller scale. In some embodiments, addresses are announced from more network locations than are able to process the received traffic. In at least some embodiments, certain network locations are not authorized to process certain types of traffic, such as traffic for certain customers, etc. In some cases, a network region might announce certain other regions to which specific types of traffic cannot be directed.

In some cases, the provider can monitor status information and automatically remap the addresses as necessary, such that the customer need not detect the outage and/or need to address any related problems. In at least some embodiments, a customer can specify one or more policies to specify how addresses should be remapped, and the circumstances or criteria that cause those addresses to be remapped. In some cases, a customer can specify a policy such that certain mappings occur at regular times in an automated fashion that the customer specifies in advance. In other cases, a customer can specify that certain re-mappings should occur in response to the occurrence of certain types of events (e.g., a region failure). Other policies can be used as well, as may be provided or specified by any appropriate entity. For example, a provider might utilize one or more policies to route customer traffic where the routing is determined based at least in part upon an originating location or address of the traffic, a type of customer corresponding to the traffic, or an amount of financial consideration associated with the traffic.

In at least some embodiments, a customer can have the ability to specify and/or update the static configuration information, such as to adjust the ranking of destination regions. For example, a customer might want to specify that traffic be directed to a location in a region associated with Minnesota. The customer can submit an API call specifying the updated configuration information, and this information can then be propagated as necessary to update the necessary configuration list(s). In at least some embodiments, a customer can specify different configuration information or policies for different regions and/or at different times. In at least some embodiments, a determination can be made as to the status of at least one region, such as whether that location is alive and available, as well as other information, such as the distance to the region from the current region and the load between the current region and the potential target region.

Various policies might be implemented by the provider as well. For example, the provider might implement a policy whereby traffic is routed to different regions throughout the course of the day. Such policies also can perform global autoscaling as well, wherein different regions can receive, process, and/or send different amounts of traffic based upon time of day or other such factors.

In one embodiment, a domain name system (DNS)-based approach can be used wherein DNS entries for hosts have the corresponding Internet protocol (IP) addresses changed or updated to be within the range announced in a new region. Different IP address ranges can be announced in different regions, and when it is desired to direct traffic to a new (or different) region the appropriate hosts can have the DNS entries updated to include values within the range of that new region. Other embodiments can control data for certain protocols, such as by managing border gateway patrol (BGP) information.

Various embodiments provide a separate control environment, or control plane, that can be used to enable a user to specify and manage various aspects of a data environment, or data plane. This "self-service" functionality can be provided via a set of Web services, enabling the user and control plane to act together as a virtual database administrator (DBA). A user or customer can submit a request to the control plane through one of a plurality of externally-visible application programming interfaces (APIs), for example. Various APIs can be used to perform specific functions with respect to various resources in the data environment. A request received to one of the APIs can be analyzed to determine the desired action(s) to be performed in the data plane, such as actions to launch a customer instance, as well as to determine any configuration parameters to be used in launching the instance. A component such as a resource management component can determine the appropriate tasks for the action, ensure that the proper launch configurations are selected, and cause the tasks to be executed in an appropriate order. At least one of these tasks typically will be performed in the data environment, such as to launch or adjust an aspect of a resource instance.

Various other functions and advantages are described and suggested below as may be provided in accordance with the various embodiments.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content. The data store also is shown to include a mechanism for storing log data 114, which can be used for purposes such as reporting and analysis. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Approaches in accordance with various embodiments can be utilized with a system such as may provide a relational database service ("RDS") that enables developers, customers, or other authorized users to obtain and configure relational databases and other such data sources so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage resources and relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
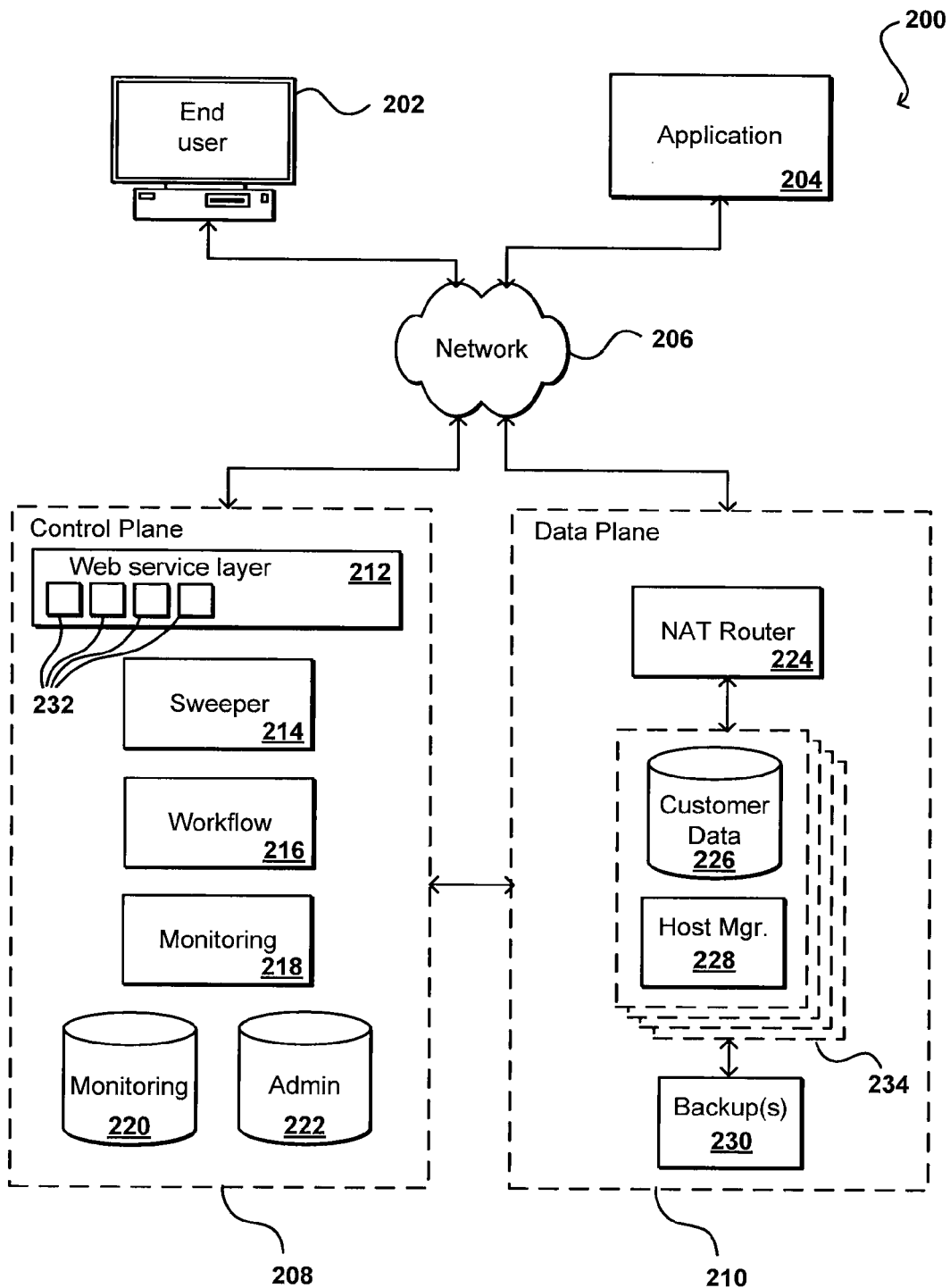
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a geographical region, or near a geographical location, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as ensuring the proper set of launch configuration parameters is specified for the request, provisioning a data store instance utilizing a set of launch configuration parameters, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. As discussed elsewhere herein, these instances can be in different regions, which can be distributed at any selected appropriate locations around the world. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process (es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to providing the functionality of a control plane as a Web service or other such service is that the control plane can function as a virtual system administrator or virtual database administrator (DBA), for example, avoiding the need for an experienced human administrator to perform tasks such as verifying launch configurations and provisioning data. Many conventional approaches require such a human administrator to receive the necessary configuration information, determine whether the configuration is valid, optimize and tune the instance, and perform other such tasks, which take a significant amount of time and effort. Further, such an approach provides many opportunities for error. The ability of a user to specify these parameters, however, can cause the user to launch instances or otherwise access resources in ways that are not optimal for the current network or system environment. Specifying a specific launch configuration when submitting a request to a control plane or service as described herein, a user or customer can obtain optimal (or at least appropriate or allowed) performance for resource access. The control plane can perform the necessary tasks to create, launch, delete, modify, expand, and/or otherwise manage a resource or resource instance in response to the request. The control plane also can support several different types of resource in a consistent fashion, without requiring an expert in each type of resource.

In conventional embodiments, a customer might be able to launch an instance (such as those described with respect to FIG. 2) anywhere in the world, at least where appropriate resources are located and the customer has access to those resources. If an address such as a static address is associated with a specific instance according to many conventional approaches, however, the traffic directed to that static address might be lost in the event of a failure or other such occurrence. In some approaches, an instance might be assigned two addresses at launch: a private address and a public address that is mapped to the private address through Network Address Translation (NAT). For IP addresses, for example, such an approach enables a customer to remap an existing DNS name to a new instance's public IP address using dynamic DNS. Such an approach can take up to 24 hours for the IP address to propagate through the Internet, however, such that new instances might not receive traffic while terminated instances continue to receive requests.

In certain environments, a customer might be able to instead associate what will be referred to herein as a "remappable" address. An example of a remappable address is the "elastic IP address" offering provided by Amazon.com, Inc. of Seattle, Wash. A customer is able to associate a remappable address with that customer's account, for example, instead of with a specific instance. Unlike traditional static IP addresses, however, remappable addresses enable the customer to remap the publicly-exposed IP address to any instance in the customer's account.

Even when utilizing remappable addresses, however, a customer is typically limited to a single region. For example, a customer who has a machine fail in Virginia might be able to launch a new instance in Virginia, or the surrounding area, and remap the remappable address to that new instance. Traffic coming in from a network (e.g., the Internet) destined for that remappable address will be routed towards that instance. A customer might utilize multiple locations within that region, such as a number of different data centers in Virginia, such that if one data center experiences a power loss, for example, the traffic can be re-routed to the other data center(s) in that region.

Using conventional approaches, however, a customer cannot remap those remappable addresses across multiple regions or to different regions. For example, a customer cannot remap to a data center outside the United States in the event of a catastrophe or other occurrence that knocks out the network in the United States. Further, a customer for whom traffic originates from primarily different regions of the world at different times is unable to remap the addresses in order to reduce the amount of traffic on the network at any given time by mapping to a data center closest to the point of most current traffic origination. A customer would have to allocate new remappable addresses and use DNS or another similar mechanism to information customers of the new endpoint(s), which can be undesirable in many different situations.

Figure 3:
FIG. 3 illustrates an example distribution of customer network locations that can be used in accordance with various embodiments.

An option that is available to a customer using conventional approaches is to "announce" all of the public addresses in each of the desired regions. In the example 300 illustrated in FIG. 3, a provider might utilize resources in at least four different areas, each of which correspond to an associated region, here the west coast of the United States (region A), the east coast of the U.S. (region B), Ireland (region C) and Asia (region D). In this example, public address space in Virginia can be announced from Virginia, and public address space in Ireland can be announced from Ireland. Here, "announce" generally means that a notification is provided by which nodes of a network such as the Internet become aware of the location of certain addresses (e.g., IP addresses) such that traffic destined for those addresses can be properly routed to that location. Since customers typically prefer traffic to utilize as short a path as is practical, and since those customers would also prefer to utilize other people's networks (e.g., over level 3 with other providers, etc.), such an approach enables traffic initiated in a given region (e.g., Europe) to be directed across a non-customer owned network (e.g., the Internet) and be directed to the location announced in Europe (e.g., Ireland in this example). Similarly, traffic sent from within the United States can be directed over the Internet to the location announced in Virginia, and can first hit the customer's network at that location. A potential downside to such an approach, however, is that if the Ireland address space becomes unavailable, the traffic originating in Europe can get dropped as the region is unaware of the address space in other regions.

In some cases, the addresses can be remapped generically using conventional approaches. In such cases, the public address space can be announced everywhere, such that the traffic can be received at any of those locations and then directed accordingly. Such an approach can be undesirable for many reasons, such as the fact that the entity announcing that address space would typically have to backhaul huge amounts of traffic between regions, such that traffic received in Ireland that may have more beneficially been received in Asia can be sent to Asia, etc. For example, a company running a web site on the West coast might have many customers on the east coast from which traffic might be received at a Virginia data center, which then would need to be hauled across the company's network to the west coast servers, meaning that the host or provider of the data centers would have to haul the data across their own network at their own expense. Such an approach also can provide scaling issues, as the address space would have to be scaled globally to accommodate traffic anywhere, even though the regions might be quite differently sized. Other such issues can result from such an approach as well.

Systems and methods in accordance with various embodiments can enable customers to utilize remappable addresses that are globally relocatable and/or indirectly remappable. In at least some embodiments, a customer utilizing a Web service through one or more application programming interfaces (APIs) can utilize and manage globally relocatable remappable IP addresses. Such an approach enables the network to take advantage of a "hot potato" approach to routing traffic, whereby a request received to one of the announced locations can be indirectly remapped and sent back out onto the Internet as quickly as possible, without having to utilize the provider's own network to direct the traffic. In one example, a customer initiating a message in Virginia that is destined to a location in Ireland can have the message sent to the Internet in Virginia and sent over the Internet to Ireland, with the Internet components being responsible for determining how to get the request to the address in Ireland. Such an approach prevents the data center provider from carrying that traffic across the provider's own network to Ireland, and then only hitting the Internet in Ireland. Since the provider will typically be paying for Internet bandwidth either way, it can be preferable to utilize that bandwidth instead of carrying the data across the Atlantic ocean on a dedicated fiber or other such private connection.

Such an approach allows for cross-region instance migration for any appropriate purpose, such as to locate instances closer to a majority of users at any specific time (e.g., to "follow the sun" around the world). Using conventional Internet-based approaches, such migration can be difficult or even impossible to accomplish when the instances are communicating with Internet hosts. Customers will generally want such migration to be performed relatively seamlessly, but this presents problem in properly routing the traffic around the Internet. In one embodiment, a domain name system (DNS)-based approach can be used wherein DNS entries for hosts can have the corresponding IP addresses changed or updated to be within the range announced in a new region. In such an approach, different IP address ranges would be announced in different regions, and when it is desired to direct traffic to a new (or different)

region the appropriate hosts can have the DNS entries updated to include values within the range of that new region.

Another approach is based on controlling data for certain protocols, such as border gateway patrol (BGP) information. BGP typically maintains a table of IP prefixes that are used with Internet routing decisions. In certain embodiments, the BGP announcements can be changed to start advertising a specific address space in the new region and stop advertising that space in the prior region. Using such an approach, traffic can head directly towards the new region while the customer keeps the same IP address. In some embodiments, a mechanism can be provided to forward and/or tunnel traffic between regions for a period during which information for a DNS- or BGP-based approach is changing.

In some embodiments, specific remappable global addresses can be used such that only a fraction of the address space is being announced in various POPs or other interface points. The fraction can be announced in some or all POPs, and in some cases different sections of address space can be announced from different POP groupings. Using conventional Internet approaches, a single IP address cannot simply be announced globally. An entity can, however, request a block of remappable addresses and want those addresses to be accessible in more than one region, such as in the Eastern U.S. and the Western U.S. In such an instance, all (or a majority of) the customers might be in the U.S., but the company might want the ability to do failover and shift traffic to the other location in the event of a problem. In some cases, a company might simply want to direct traffic according to the location of the majority of customers at any given time. For example, if a company has customers around the globe and those customers tend to hit the network during business hours in their part of the world, then the company might want to adjust their addresses to different regions throughout the day in order to attempt to minimize the majority of the data paths needed at any given time. In one example, the customer can be given a "/24" that can be announced into the global BGP. A "/24" generally refers to a block of Internet addresses summarized in a routing table as an address in dotted decimal notation followed by a forward slash ("/") and a two-digit decimal number giving the number of leading bits in the subnet mask. The /24 then can be announced from the desired region at any given time. Optimal request routing then could be performed for that subset of traffic, and the customer can be charged an appropriate amount.

In one embodiment, the size of an address block can be selected to be large enough for a customer such that a provider can selectively chose a region from which to advertise at least a portion of that space. In another embodiment, pre-allocated blocks of addresses can be used which can be advertised in some or all regions, with the understanding that a large amount of traffic will need to be hauled over the provider network. A large customer could potentially utilize a number of remappable addresses out of the globally advertised block, and the provider can take care of determining how to direct the traffic on a smaller scale.

In at least some of these embodiments, the customer is still able to receive many desirable failure-related characteristics. Using remappable addresses in a conventional system, a customer having a number of remappable addresses in Virginia will experience problems if there is a transit outage in Virginia, as those addresses will at least temporarily be unavailable and requests will get dropped as soon as they hit the network backbone. If the customer has rented a group of global remappable addresses, however, those addresses might be mapped to Virginia but can be announced at many points around the globe, such that when Virginia drops off the Internet these addresses are still announced at all the other points of presence (POPs) on the Internet. The customer thus is able to have an instance launched in another region, and one or more of the global remappable addresses can be mapped to that instance, such that the service will quickly be available again. An advantage of such a process is that the entire operation can be completely contained within the provider network, such that there is no lag time or delay waiting for Internet BGP or DNS to propagate. The customer does not need to interact with their Internet service provider, but can instead make one or two API calls to the provider, for example, such that the DNS names and IP addresses can be made available again rather quickly.

In some cases, the provider can monitor the status and can automatically remap the addresses as necessary, such that the customer need not detect the outage and/or need to address any related problems. In at least some embodiments, a customer can specify one or more policies to specify how addresses should be remapped, and the circumstances or criteria that cause those addresses to be remapped. In some cases, a customer can specify a policy such that certain mappings occur at regular times in an automated fashion that the customer specifies in advance. In other cases, a customer can specify that certain re-mappings should occur in response to the occurrence of certain types of events (e.g., a region failure).

In at least some embodiments, each region knows about each other region in which a customer has address space with a provider. There can be communications established between those regions, such as over one or more tunnels. A list of mappings can be maintained that indicates which addresses, or what section of address space, is currently outside the region. Thus, when traffic comes into a first region for a global remappable address that is currently mapped to a second region, the provider can do the address translation and destination lookup on the incoming traffic to determine the destination region. The first region might be able to determine any information other than the identity of the second region, but can direct the traffic along the tunnel to the second region. Once at the second region, an appropriate routing protocol lookup can be performed as the traffic is local at that point.

In this example, region such as Los Angeles and Virginia can always advertise a given IP address onto the Internet. If a user is sitting in a store in Virginia, the local ISP will generally prefer to get rid of that traffic quickly using a hot potato routing approach. Thus, the ISP will generally direct the traffic to the Virginia region. If there is an occurrence such as a transit outage in Virginia, however, the backbone ISP would still receive the announcement from L.A., such that the backbone can haul the information to the L.A. region.

In some embodiments, the addresses can be announced from more regions than will actually be used to process the requests. For example, a global remappable address can be announced from each of five different regions across the globe. The address itself might be mapped to two of those regions, such as instances in VA and Ireland. The mappings can be configured such that traffic arriving in VA is serviced in VA and traffic arriving in Ireland is serviced in Ireland. The mappings can also be configured such that traffic arriving in a West coast U.S. region is directed to VA, and traffic arriving in Asia is directed to Ireland, etc. The addresses thus are announced in five different places, but directed to, and serviced by, only two of those locations. In at least some embodiments there is no intelligence, as the routing is determined by the configuration. In at least some embodiments, there can be built in intelligence or policies that dictate that traffic gets routed to different locations based on various factors, such as current load, time of day, etc.

Figure 4:
FIG. 4 illustrates an example ranking list for customer network locations that can be used in accordance with various embodiments.

In some embodiments, an anycasting approach can be used wherein there is no status detection or flow hashing but traffic is directed to a specific region based on factors such as the current time zone. As used herein, anycasting generally refers to an approach known in the art for routing traffic to a member of a group of potential receivers that are all associated with the same destination address. In at least some embodiments, static configuration information can be provided that can include specific regions to which to direct traffic at any or all times, depending upon where that traffic is received. In other embodiments, the static configuration information can include an ordering or ranking of various regions to which traffic can be directed. For example, other regions can be ranked based upon network proximity. Thus, when traffic is inbound for a particular address, a determination can be made as to where the global remappable address is active and the list can be consulted to determine the ordering of various regions. In at least one embodiment, the traffic is directed to the region where the address is active that is highest on the ranking list. In one example, a ranking list 400 such as that illustrated in FIG. 4 might list (in descending order) L.A., Virginia, and Ireland, and the global address for the traffic might be active in Ireland and Virginia. In this case, the traffic would be directed to Virginia because that is the highest ranked region where the address is active.

In at least some embodiments, a customer can have the ability to specify and/or update the static configuration information, such as to adjust the ranking at various or specific times. For example, a customer might want to specify that traffic be directed to a location in a region associated with Minnesota. Using a system such as that described with respect to FIG. 2, the customer can submit an API call specifying the updated configuration information, and this information can then be propagated as necessary to update the necessary configuration list(s). In at least some embodiments, a customer can specify different configuration information or policies for different regions and/or at different times. Various other types of information can be included or utilized as well as should be apparent in light of the present disclosure.

In at least some embodiments, the determination of the appropriate region can be more dynamic. For example, a determination can be made as to the status of at least one region, such as whether that location is alive and available, as well as other information, such as the distance to the region from the current region and the load between the current region and the potential target region. In one example, traffic might be received in L.A. that under normal conditions might be directed to Virginia. If there is a massive network event on the east coast that makes Virginia unavailable at the present time, the traffic can instead be routed to the next closest available region, which in this case could be located in Asia. When Virginia is back online, Virginia might again be the better choice so subsequent traffic might be routed to Virginia. Various other factors can be included in the dynamic decision as well. For example, the majority of a customer's fleet might be on the west coast, with a relatively small presence in other locations. Accordingly, the customer might want to request a weighted traffic balancing wherein the bulk of the customer traffic goes to a specified region and a smaller amount goes to the other regions. Any of a number of other such policies can be implemented as well within the scope of the various embodiments.

Various policies might be implemented by the provider as well. For example, the provider might implement a "follow the sun" type policy where traffic is routed to different regions throughout the course of the day, as discussed above, such that the average path length is shortened by routing traffic based on where the highest load is around the globe based on time of day, where that load shifts around the globe based on relative differences in day and night periods, etc. Such policies also can perform global auto-scaling as well, wherein different regions can receive, process, and/or send different amounts of traffic based upon time of day or other such factors. In some embodiments, a customer can move a site or application "around the world" over each 24 hour period in order to adapt to the location where a majority of the traffic will be relatively local to the current region.

It should be understood that various conventional approaches provide some level of global request routing solutions. For example, Akamai Technologies of Cambridge, Mass., offers edge solutions that enable applications to be run at the edge of a network, with global DNS directors having the ability to dynamically direct load based on capacity. A global DNS director can act as a load balancer that is not operating on the data plane but only handing balancing at the DNS level. If there are two data centers in different time zones, the DNS director can obtain information from load balancers (or other components) from each time zone indicating an amount of current capacity, and the director can weight the DNS responses based at least in part upon that capacity. If there is a change in load or fleet membership (i.e., a number of additional servers are brought online), for example, the DNS director can make decisions accordingly. Such an approach is relatively limited in its ability and is not strongly consistent. Further, there will be some time lag relative to approaches discussed herein. Conventional approaches do not utilize global remappable IP addresses, particularly at the service provider level, and thus cannot provide various advantages or implementations in the present disclosure.

Figure 5A:
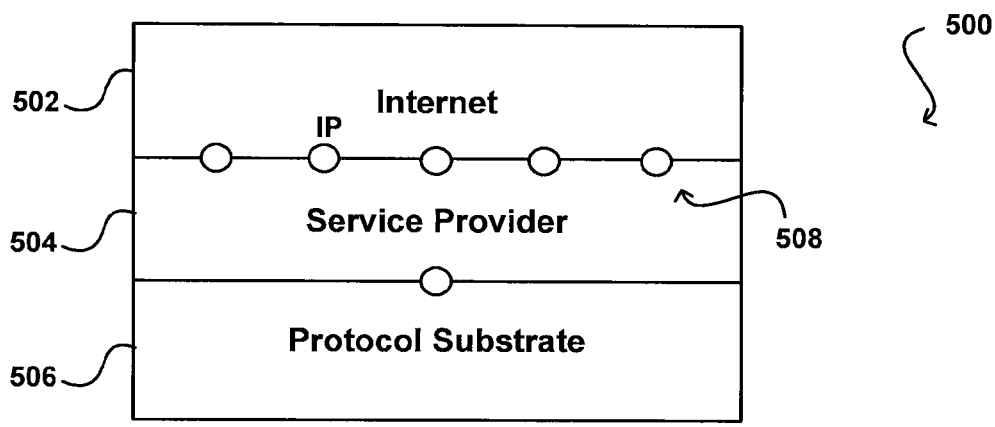
FIGS. 5(*a*) and 5(*b*) illustrate representations of mapping points in conventional approaches and in accordance with various embodiments.
Figure 5B:
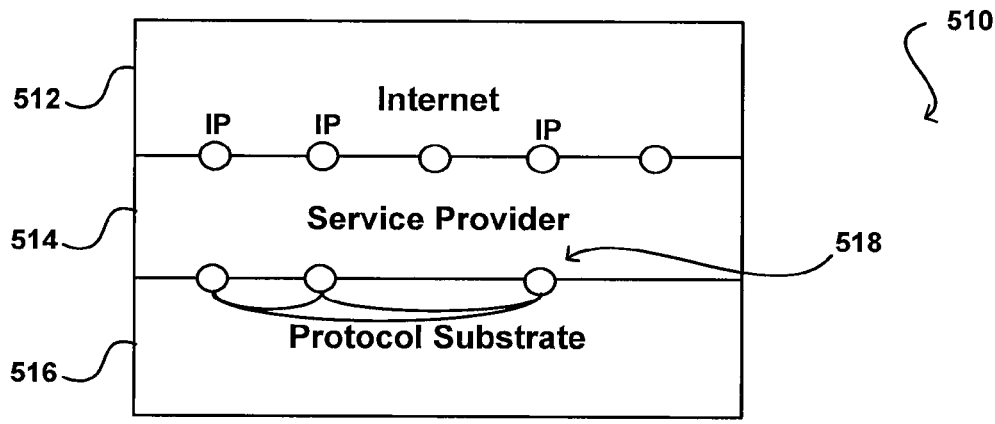

An approach that can be used to explain at least some of the differences of various embodiments with respect to certain conventional systems can be described with respect to FIGS. 5(a) and 5(b). In FIG. 5(a), a three level representation 500 is illustrated, which includes the Internet 502 as a top layer, a service provider 504 as a middle layer, and an underlying protocol layer 506 (e.g., a routing protocol substrate). The protocol layer is well connected and fully mapped, and everyone participates in the same area of the protocol layer. In the conventional approach of FIG. 5(a), there are many different points 508 at which the Internet "touches" the service provider. Exactly one of those points would announce a specific IP address for purposes of routing traffic. In the approach of FIG. 5(b), however, more than one of those points where the service provider 514 touches the Internet 512 can announce the same global remappable IP address. Then locally, in the site where the IP address is announced, traffic inbound for that IP can be encapsulated with protocol-specific information such that the protocol layer 516 can interconnect the various locations 518.

In various embodiments, interconnection can be provided using other approaches where the routing protocol substrate does not exist, such as with a regular IP for NAT translation, etc. For example, traffic can come from the Internet going to a specific global IP address, which could be translated to a relatively slow moving address that is region-specific. The traffic then could make its way towards that region, and when at the region translate the address to the address of an actual host to receive the traffic, which can involve a much faster moving mapping. In one example, two NAT translation devices can be used where the source region is encoded into the destination IP address, where there are two or more IP addresses and at least one of those addresses is a global remappable IP address. Traffic can be received that is destined for a global IP address, which can effectively be remapped to a region-specific remappable IP address. The response traffic can be remapped in a similar fashion.

Such an approach effectively utilizes uni-directional mappings instead of (or in addition to) conventional bi-directional mappings. Consider a situation with the following IP addresses:

A=global remappable IP address
B=L.A.-specific IP address
C=internal provider IP address (e.g., host/instance address)
D=L.A.-specific IP address In an example where traffic arrives in L.A. that has a destination corresponding to global address A, that traffic can be directly mapped to internal address C to be delivered to the appropriate instance, etc. This is similar to how routing works using conventional approaches. If the traffic instead arrives in another region such as Virginia that is destined for global address A, Virginia can have a uni-directional mapping from A→B such that traffic from the Internet can be mapped to address B in L.A. Since the provider can be aware that the entire address block of which B is a member is in L.A., the provider can send the traffic down the provider's backbone over the Internet to L.A., which has a uni-directional mapping from B→C such that the traffic can reach the intended instance. Any return traffic then can go from C→A according to a direct remapping, such that the traffic can go directly out to the Internet without having to be hauled back to Virginia.

In at least some embodiments, the source region can also be encoded in such an approach. For example, Ireland might have a mapping from A→D but not from A→B, although both B and D are located in L.A. Traffic inbound for A that is received in Ireland can undergo a NAT process to change the destination address to D, whereby the traffic can be sent over the backbone or WAN to L.A., where a similar D→C mapping can be performed as with the previous example. In this case, however, the system can differentiate between traffic that ingressed in Virginia and traffic that ingressed in Ireland. Such an approach enables a determination in L.A. of the region (but not necessarily the instance) from which the traffic ingressed. Such an approach can enable traffic between regions to be pushed back onto the Internet instead of backhauled over a provider network if the intermediate IP is publicly routable. In at least some embodiments, the decision whether to backhaul or push out onto the Internet can be made based on a number of factors, such as current load and transit prices.

Figure 6:
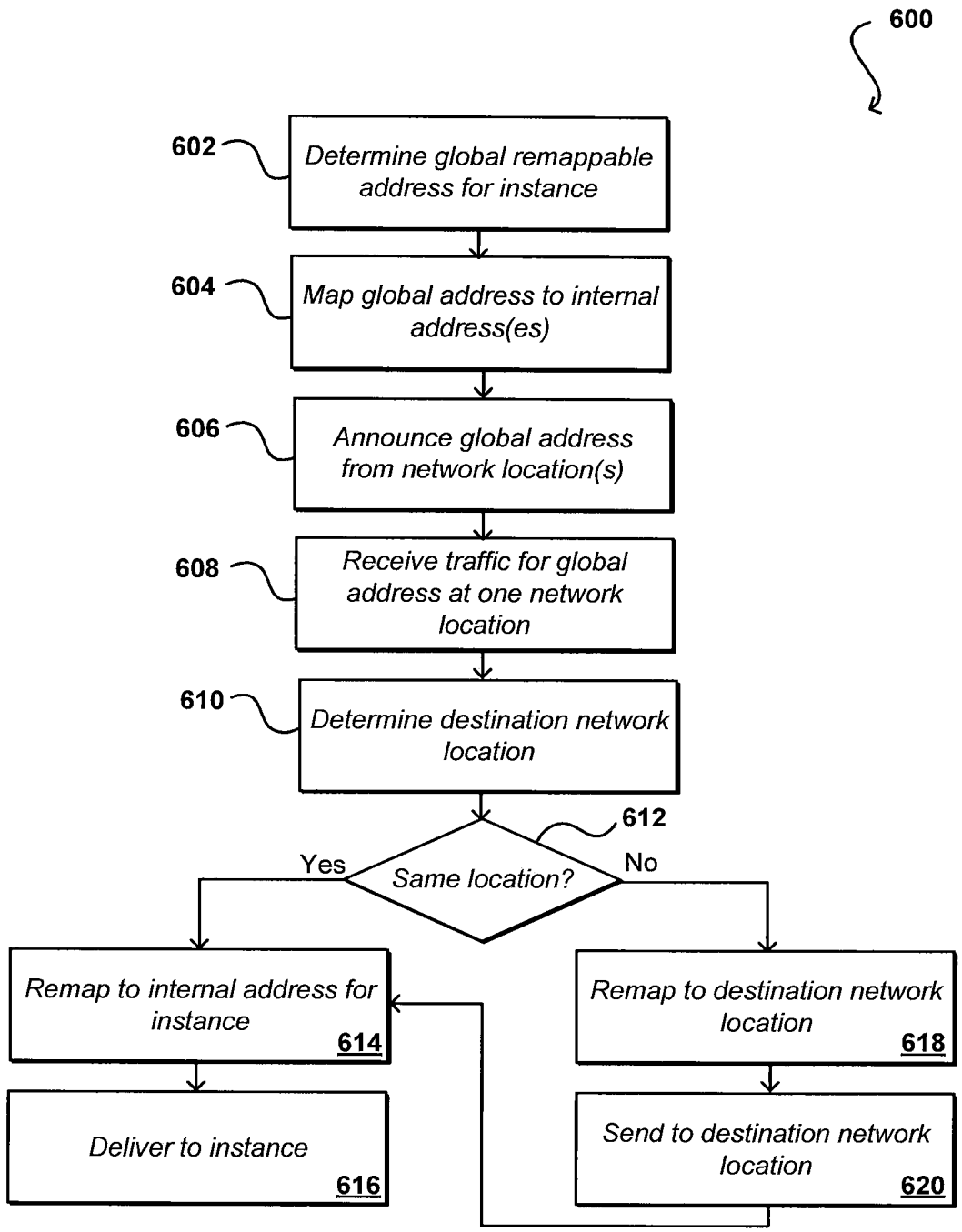
FIG. 6 illustrates an example process for directing traffic that can be used in accordance with various embodiments.

FIG. 6 illustrates an example process 600 for routing traffic using global addresses that can be used in accordance with various embodiments. In this example, a global remappable address is selected for at least one customer instance 602. As discussed, the address can point to various other types of destination as well. The global address can be mapped to any appropriate internal or intermediate address as well 604, such as intermediate regional addresses or individual instance addresses. The global address can then be announced from one or more regions 606, which can be at any appropriate location as discussed herein. Also as discussed, the regions from which the global address is announced can change at various times. When traffic is subsequently received to one of the regions that is destined for the global remappable address 608, the destination region can be determined 610. As discussed, this can be a static determination based at least in part upon configuration information or can be a dynamic decision based upon factors such as current load, current availability, distance to region, ranking information, etc.

If the determined destination region is determined to be the same region in which the traffic was received 612, the traffic can be remapped to the internal address for the appropriate instance 614, and the traffic can be delivered to that instance 616. If the region in which the traffic was received is not the destination region as determined, the traffic can be remapped to the destination region 618 and forwarded to the destination region 620. As discussed, this forwarding can be over a private provider network or a public network, depending on various factors discussed herein. When the traffic reaches the destination, the traffic can be remapped and delivered to the instance accordingly.

In various embodiments, similar mappings and translations can be performed at the DNS level as well. For example, if a provider controls the DNS for a given host, the DNS response can be modified such that the translation is between DNS name and IP address, rather than between IP addresses. Such an approach can be used in place of a NAT translation or other protocol-specific encapsulation, for example.

Further, certain embodiments can handle traffic received around the time of a change in different ways. For example, a host with a global IP and DNS name might have that DNS name routed to a new region. In some embodiments, all traffic received at the old region can be dropped. In at least some embodiments, however, the system can direct traffic to the new region even though the ultimate destination might not yet be known or yet available. In still other embodiments where state information is being maintained, transactions can continue to be services that were live in the prior region. The existing transactions can be processed in the old region, with new traffic being sent to the new region, in order to avoid dropping traffic during the transition period.

Various other approaches can utilize at least some of the above-described functionality as well. For example, systems utilizing Internet Protocol Version 6 (IPv6) can utilize such approaches, even though IPv6 does not utilize with NAT according to conventional approaches. The intermediary IP address can still be used, however, such that various address translation approaches discussed herein can be utilized. In other approaches, traffic arriving in a region that has had the first translation from the global IP to the region-specific IP can be translated back to the globally-specific IP address and delivered like normal. In at least some embodiments, the address announcements can be extended to cloud-front points of present (POPs). Using such an approach, the traffic can be moved onto the provider's network quickly such that any desired adjustments can be made more quickly.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of directing network traffic, comprising:
under control of one or more computer systems configured with executable instructions,
mapping a global remappable Internet protocol (IP) address to at least one virtual instance located in at least one network location of a plurality of network locations;
announcing the global remappable IP address from at least two of the plurality of network locations;
receiving network traffic to a receiving network location of the at least two network locations from which the global remappable IP address is announced;
determining a destination network location for the network traffic;
when the destination network location is different from the receiving network location:
remapping the network traffic to an intermediate IP address for the destination network location, and sending the network traffic to the intermediate IP address in the destination network location; and remapping the network traffic and delivering the network traffic to a target instance of the at least one virtual instance when the network traffic is received at the destination network location, wherein the destination network location being different from the receiving network location includes the destination network location and the receiving network location being located in geographically separated regions.

2. The computer-implemented method of claim 1, further comprising:

determining whether to send the network traffic to the intermediate IP address in the destination network location over a private network of a service provider receiving the network traffic or over the Internet.

3. The computer-implemented method of claim 2, wherein determining whether to send the network traffic to the intermediate IP address over a private network or the Internet is based at least in part on a current load of the private network.

4. A computer-implemented method of directing network traffic, comprising:

under control of one or more computer systems configured with executable instructions, announcing a global remappable address from at least two points of a service provider network;

receiving network traffic at a receiving network location of the service provider network, the network traffic being received to the global remappable address, each point capable of being in a different network location and being mapped to a target destination of the service provider network;

determining a destination network location for the network traffic; and when the destination network location is different from the receiving network location:

remapping the network traffic to an intermediate address of the service provider network for the destination network location, sending the network traffic to the intermediate address in the destination network location, and remapping the network traffic and delivering the network traffic to the target destination when the network traffic is received at the destination network location, wherein the destination network location being different from the receiving network location includes the destination network location and the receiving network location being located in geographically separated regions.

5. The computer-implemented method of claim 4, wherein the global remappable address is a global remappable Internet protocol (IP) address, and wherein the service provider enables global routing of the network traffic using at least one of domain name system (DNS) or border gateway protocol (BGP) routing.

6. The computer-implemented method of claim 4, wherein the target destination corresponds to at least one virtual machine in a multi-tenant resource environment.

7. The computer-implemented method of claim 6, wherein a customer is able to submit updated policies through at least one application programming interface (API).

8. The computer-implemented method of claim 4, wherein a customer corresponding to the target destination is enabled to submit at least one policy useful in determining the target destination.

9. The computer-implemented method of claim 8, wherein a customer is able to submit at least one policy per network location.

10. The computer-implemented method of claim 4, wherein different network locations correspond to networks operated by different providers.

11. The computer-implemented method of claim 4, wherein a policy for determining the target destination designates network locations to which to direct the network traffic at specific times of day.

12. The computer-implemented method of claim 4, wherein at least one policy is utilized to determine the target destination, the at least one policy determining the target destination based on at least one of an originating location of the network traffic, a type of customer corresponding to the network traffic, or an amount of financial consideration associated with the network traffic.

13. The computer-implemented method of claim 4, wherein the target destination is determined using static configuration information indicating a network location to which to route the traffic based at least in part upon a network location in which the network traffic is received.

14. The computer-implemented method of claim 4, wherein the target destination is determined dynamically based on factors including at least one of current load of certain network locations and a network proximity of certain network locations.

15. The computer-implemented method of claim 4, wherein the target destination is determined using a list ranking various network locations and a list of network locations in which the global remappable address is active.

16. The computer-implemented method of claim 4, wherein the global remappable address is capable of being announced from network locations in at least one of different countries and different continents.

17. The computer-implemented method of claim 16, wherein at least one network location from which the global remappable address is announced does not have local resources to which at least certain types of traffic are able or authorized to be transmitted for processing.

18. The computer-implemented method of claim 4, wherein the network traffic is capable of being sent to the intermediate address using a public or private network.

19. The computer-implemented method of claim 4, wherein at least some of the mappings between the global remappable address, the intermediate address, and a destination address are uni-directional.

20. The computer-implemented method of claim 4, wherein the global remappable address is capable of being mapped to fewer network locations than a number of network locations from which the global remappable address is announced.

21. The computer-implemented method of claim 4, wherein the network traffic is directed using an anycast approach.

22. The computer-implemented method of claim 4, wherein a customer is able to specify a weighted traffic balancing wherein an approximate amount of the received traffic is directed to at least one network location.

23. The computer-implemented method of claim 4, wherein addresses are globally remappable to new virtual machines, and wherein existing transactions are capable of being processed using a previous virtual machine while new transactions are directed to a new virtual machine for processing.

24. A system for managing network traffic, comprising:
a processor; and
a memory device including instructions that, when executed by the processor, cause the processor to:
announce a global remappable address from at least two points of a service provider network;
receive network traffic at a receiving network location of the service provider network, the network traffic being received to the global remappable address, each point capable of being in a different network location and being mapped to a target destination of the service provider network;
determine a destination network location for the network traffic; and
when the destination network location is different from the receiving network location:
remap the network traffic to an intermediate address of the service provider network for the destination network location, and
send the network traffic to the intermediate address in the destination network location, whereby the network traffic is able to be remapped and delivered to the target destination when the network traffic is received at the destination network, wherein the destination network location being different from the receiving network location includes the destination network location and the receiving network location being located in geographically separated regions.

25. The system of claim 24, wherein the target destination is determined according to at least one or a policy, ranking list, network load, or static configuration.

26. The system of claim 24, wherein the network traffic is capable of being sent to the intermediate address using a public or private network.

27. A non-transitory computer-readable storage medium storing instructions for managing network traffic, the instructions when executed by a processor causing the processor to:
announce a global remappable address from at least two points of a service provider network;
receive network traffic at a receiving network location of the service provider network, the network traffic being received to the global remappable address, each point capable of being in a different network location and being mapped to a target destination of the service provider network;
determine a destination network location for the network traffic; and
when the destination network location is different from the receiving network location:
remap the network traffic to an intermediate address of the service provider network for the destination network location, and
send the network traffic to the intermediate address in the destination network location, whereby the network traffic is able to be remapped and delivered to the target destination when the network traffic is received at the destination network location,
wherein the destination network location being different from the receiving network location includes the destination network location and the receiving network location being located in geographically separated regions.

28. The non-transitory computer-readable storage medium of claim 27, wherein at least some of the mappings between the global remappable address, the intermediate address, and a destination address are uni-directional.

* * * * *

UNITED STATES PATENT AND TRADEMARK OFFICE
CERTIFICATE OF CORRECTION

PATENT NO. : 10,009,315 B2
APPLICATION NO. : 13/044494
DATED : June 26, 2018
INVENTOR(S) : Andrew B. Dickinson and Eric Jason Brandwine Page 1 of 1

It is certified that error appears in the above-identified patent and that said Letters Patent is hereby corrected as shown below:

In the Claims

Column 23, Line 34, Claim 25:
Delete: "is determined according to at least one or a policy, ranking"
Insert: --is determined according to at least one of a policy, ranking--

Signed and Sealed this
Sixteenth Day of July, 2019

Andrei Iancu
*Director of the United States Patent and Trademark Office*